(12) United States Patent
He et al.

(10) Patent No.: US 8,772,653 B2
(45) Date of Patent: Jul. 8, 2014

(54) ENCRYPTION KEYBOARD

(75) Inventors: Jing He, Guangzhou (CN); Xiaodian Chen, Guangzhou (CN); Junkun Zhang, Guangzhou (CN); Dong Wei, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 226 days.

(21) Appl. No.: 13/497,608

(22) PCT Filed: Aug. 19, 2010

(86) PCT No.: PCT/CN2010/076135
§ 371 (c)(1),
(2), (4) Date: Mar. 22, 2012

(87) PCT Pub. No.: WO2011/038619
PCT Pub. Date: Apr. 7, 2011

(65) Prior Publication Data
US 2012/0193207 A1    Aug. 2, 2012

(30) Foreign Application Priority Data
Sep. 29, 2009  (CN) .......................... 2009 1 0192854

(51) Int. Cl.
*H01H 13/83* (2006.01)

(52) U.S. Cl.
USPC .............. 200/5 A; 341/22; 361/749; 361/760; 361/679.08; 380/52

(58) Field of Classification Search
CPC ....... G06F 21/83; G06F 21/86; G06F 1/1662; H04L 63/08; H01H 2223/002; Y04S 40/24
USPC ........... 380/52; 341/22; 200/5 A; 361/679.08, 361/749, 760
See application file for complete search history.

(56) References Cited

U.S. PATENT DOCUMENTS 4,527,030 A * 7/1985 Oelsch .......................... 200/515

4,749,368 A * 6/1988 Mouissie ...................... 439/421

(Continued)

FOREIGN PATENT DOCUMENTS

| CN | 2603436 Y | 2/2004 |
|----|-----------|--------|
| CN | 181514 A  | 8/2006 |

(Continued)

OTHER PUBLICATIONS

Extended European Search Report dated Mar. 27, 2013 from corresponding European Application No. 10819848.2.

(Continued)

*Primary Examiner* — Kambiz Zand
*Assistant Examiner* — Tongoc Tran
(74) *Attorney, Agent, or Firm* — Wolf, Greenfield & Sacks, P.C.

(57) ABSTRACT

An encryption keyboard is provided, especially an encryption keyboard including a front spying and detecting protection system. The encryption keyboard comprises a panel and a main control panel. A sealed flexible printed circuit board (PCB) is set between the panel and the main control panel. A circuit for preventing from spying and detecting is set in the sealed flexible circuit. The circuit for preventing from spying and detecting is connected to the surface of the sealed flexible circuit through a circuit pin, and is connected electrically to the control circuit of the main control panel for realizing a self-destroyed function through the circuit pin. The keyboard also includes a split style key grain, which comprises a keycap and a press post. The keycap comprises a cap top and an admission space which is positioned on the undersurface of the cap top and includes a downward opening. The keycap sockets the press post through the admission space, and a gap matching is formed between the press post and the wall of the admission space.

6 Claims, 4 Drawing Sheets

(56) References Cited

U.S. PATENT DOCUMENTS

| | | | |
|---|---|---|---|
| 5,586,042 A * | 12/1996 | Pisau et al. ............... | 702/65 |
| 5,877,547 A * | 3/1999 | Rhelimi .................. | 257/679 |
| 6,463,263 B1 * | 10/2002 | Feilner et al. ............ | 455/90.1 |
| 6,936,777 B1 * | 6/2004 | Park et al. ............... | 200/344 |
| 7,270,275 B1 * | 9/2007 | Moreland et al. ......... | 235/492 |
| 7,283,066 B2 * | 10/2007 | Shipman ................. | 341/22 |
| 2003/0201983 A1 | 10/2003 | Jokinen et al. | |
| 2004/0118670 A1* | 6/2004 | Park et al. ............... | 200/344 |
| 2006/0102458 A1 | 5/2006 | Kim et al. | |
| 2007/0040674 A1* | 2/2007 | Hsu ....................... | 340/539.31 |
| 2007/0152042 A1* | 7/2007 | Mittler .................... | 235/383 |
| 2007/0204173 A1* | 8/2007 | Kuhn ..................... | 713/194 |
| 2007/0295810 A1* | 12/2007 | Hopt et al. .............. | 235/441 |
| 2008/0180245 A1* | 7/2008 | Hsu et al. ................ | 340/571 |
| 2009/0058626 A1* | 3/2009 | Watabe .................. | 340/447 |
| 2009/0094700 A1 | 4/2009 | Goto et al. | |
| 2009/0184850 A1 | 7/2009 | Schulz et al. | |

FOREIGN PATENT DOCUMENTS

| | | |
|---|---|---|
| CN | 1812031 A | 8/2006 |
| CN | 1987833 A | 6/2007 |
| CN | 200979849 Y | 11/2007 |
| CN | 201142285 Y | 10/2008 |
| CN | 101697182 A | 4/2010 |
| CN | 201522951 U | 7/2010 |
| EP | 1873680 A1 | 1/2008 |
| GB | 2178242 A | 2/1987 |
| WO | WO 2005001673 A1 | 1/2005 |

OTHER PUBLICATIONS

International Search Report dated Nov. 25, 2010 from corresponding International Application No. PCT/CN2010/076135.

Extended European Search Report dated Oct. 23, 2013 from corresponding European Application No. 13179754.0.

* cited by examiner

1

ENCRYPTION KEYBOARD

This application is a National Stage application of PCT/CN2010/076135 filed on Aug. 19, 2010, which claims the benefit of Chinese patent application No. 200910192854.3 titled "Encryption Keyboard" and filed with the State Intellectual Property Office on Sep. 29, 2009. Both the international application and the Chinese application are incorporated herein by reference in their entireties.

FIELD OF THE INVENTION

The present invention relates to an encryption keyboard, and in particular, to an encryption keyboard with a detection and protection system against frontal probing.

BACKGROUND OF THE INVENTION

Hardware encryption keyboards of self-serving banking terminals are responsible for handling users' banking passwords inputting and encryption processing. Hence, working keys and master keys of the banks are stored in core processing components of the keyboards. Those who with unlawful purposes may pry or probe into the keyboards to capture user passwords, or even to read working keys and master keys of the banks, in order to steal documents from the banks, putting the documents and money of users and banks at risk.

Generally, encryption keyboards include a probing detection and protection structure, and a probing detection and protection circuit. When physical probing is initiated to a keyboard, the probing detection and protection circuit outputs a self-destruct signal, to enable a self-destruct function of the encryption keyboard, thereby preventing the bad guys from stealing the documents.

As shown in FIG. 1, a conventional encryption keyboard includes: a keyboard panel 1, a lining plate 2, keys 3, a water-resistant silica gel layer 4, a main control board 8, and a bottom plate 9. The keyboard is assembled by stacking up these components in sequence. Due to lack of a protective structure in front of the keyboard, the main control board 8 may easily be accessible to the bad guys if they have some of the components 1 to 4 damaged. In this manner, information in the circuit of the main control board can be obtained, and information that is crucial to the safe use of the self-serving terminals, e.g., user inputted passwords, may be stolen.

Therefore, it is of great importance to provide an encryption keyboard with a detection

SUMMARY OF THE INVENTION

An object of the invention is to provide an encryption keyboard with a detection and protection system against frontal probing, which effectively prevents illegal probing for password information from the front of the keyboard panel.

To realize the object of the invention, the invention provides the following technical solution.

An encryption keyboard includes a panel and a main control board. A sealed flexible circuit board is provided between the panel and the main control board. An anti-probing detection circuit is provided in the sealed flexible circuit board. The anti-probing detection circuit is connected to a surface of the sealed flexible circuit board via a circuit pin, and electrical connection is formed via the circuit pin between the anti-probing detection circuit and a control circuit of the main control board which implements a self-destruct function.

Preferably, a backing plate is provided between the sealed flexible circuit board and the main control board. A through-hole is formed in the backing plate correspondingly to the circuit pin. The through-hole is adapted to contain conductive rubber. The electrical connection between the anti-probing detection circuit and the control circuit of the main control board which implements the self-destruct function is formed via the circuit pin by the conductive rubber.

Preferably, a water-resistant silica gel plate is provided between the panel and the sealed flexible circuit board.

Preferably, the encryption keyboard further includes a lining plate. The lining plate is arranged between the panel and the water-resistant silica gel plate. A plurality of key holes are formed on the panel, the lining plate, the water-resistant silica gel plate, the sealed flexible circuit board and the backing plate. A plurality of keys are mounted in the key holes. Each of the keys includes a key cap and a push rod. The push rod includes a first end connecting with the key cap, and a second end penetrating through the key hole to contact with and push a key contact on the main control board. The key cap includes a cap top, and a container on the lower surface of the cap top and having a downward opening. The key cap joins with the first end of the push rod via the container, and the first end of the push rod has a diameter smaller than an inner diameter of the container.

Further, an umbrella-shaped structure is provided, which joins between the first end and the second end of the push rod. The umbrella-shaped structure has a diameter larger than a diameter of the key hole on the sealed flexible circuit board.

Further, the second end of the push rod has a diameter smaller than the diameter of the key hole, and larger than a diameter of a package structure of the key contact on the main control board.

Further, the key cap is made of stainless steel, and the push rod is made of heat-treated steel grade 45 having a hardness larger than 45.

Preferably, the encryption keyboard further includes a bottom plate. Welded bolts for packaging the keyboard are provided on the panel of the encryption keyboard. Through-holes for holding the welded bolts are provided on the lining plate, the water-resistant silica gel plate, the sealed flexible circuit board, the backing plate, the main control board and the bottom plate correspondingly to the welded bolts on the panel. The lining plate, the water-resistant silica gel plate, the sealed flexible circuit board, the backing plate, the main control board and the bottom plate are mounted on the welded bolts sequentially, and are fastened with corresponding nuts.

Preferably, the number of the welded bolts is nine. Eight of the bolts are arranged along the four edges of the keyboard panel, with each edge having two blots. The ninth bolt is arranged in the middle of the encryption keyboard, and the conductive rubber is arranged near the ninth welded bolt.

The technical solution provided by the invention has the following advantages over the prior art:

First of all, a sealed flexible circuit board is provided between the keyboard panel and the main control board. The sealed flexible circuit board covers the whole main control board, so that illegal probing from the front of the keyboard panel can be detected by its internal anti-probing detection circuit while meeting the flexible circuit board, which activates the self-destruct of the encryption keyboard.

Secondly, the detachable structure of the keys further prevents the illegal probing from the front of the keyboard panel. Each of the keys includes a key cap and a push rod; the push rod includes a first end connecting with the key cap, and a second end penetrating through the key hole to contact with and push a key contact on the main control board; the key cap includes a cap top, and a container on the lower surface of the cap top and having a downward opening; the key cap joins with the first end of the push rod via the container, and the first end of the push rod has a diameter smaller than an inner diameter of the container, therefore, a gap is formed between the push rod and the cap top. As the gap may make things slippery, it may trouble the bad guys while they are trying to probe into the key cap from its front, thereby preventing probing.

DETAILED DESCRIPTION OF THE INVENTION

Technical solutions of the embodiments of the invention are clearly and fully described below in conjunction with the accompanying drawings of the embodiments of the invention. As a matter of course, the embodiments described herein are merely some of the possible embodiments of the invention. Other embodiments obtained by those skilled in the art based on the embodiments described herein without inventive efforts should be included in the scope of the invention.

Figure 3:
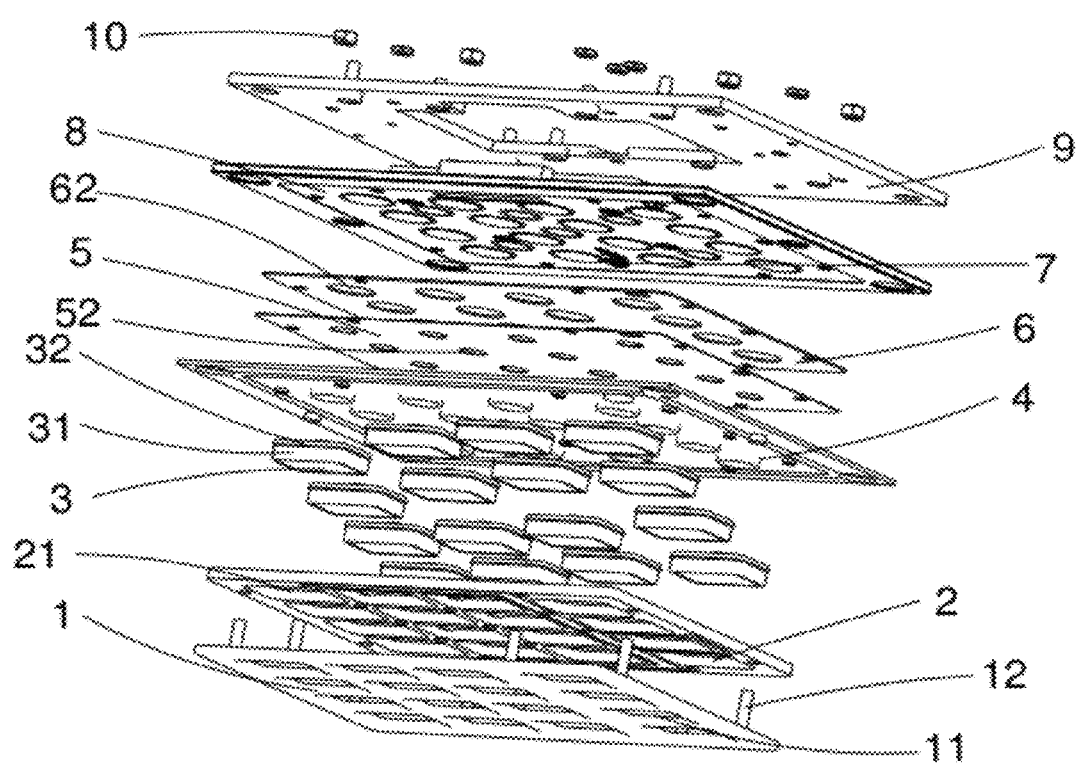
FIG. 3 is an exploded view of the novel encryption keyboard of FIG. 2.

Now refer to FIG. 3. An encryption keyboard 100 provided by the invention includes: a keyboard panel 1, a lining plate 2, keys 3, a water-resistant silica gel plate 4, a sealed flexible circuit board 5, a backing plate 6, conductive rubber 7, a main control board 8 and a bottom plate 9. The components above 1 to 9 are assembled sequentially to form the encryption keyboard 100.

The casing of the key 3 has a structure including two steps (31, 32). Correspondingly, key through-holes (11, 21) are formed on the keyboard panel 1 and the lining plate 2 respectively. The size of the key through-hole 11 of the keyboard panel 1 is slightly larger than the size of the key step 31, so that the key 3 can be positioned by the keyboard panel 1 and packaged on the main control board 8. Welded bolts 12 for packaging the keyboard are provided on the keyboard panel 1. Through-holes for holding the bolts 12 are provided on the lining plate 2, the water-resistant silica gel plate 4, the sealed flexible circuit board 5, the backing plate 6, the main control board 8 and the bottom plate 9 correspondingly to the welded bolts 12 on the keyboard panel 1. The lining plate 2, the water-resistant silica gel plate 4, the sealed flexible circuit board 5, the backing plate 6, the main control board 8 and the bottom plate 9 are mounted on the welded bolts 12 sequentially, and then fastened with nuts 10.

The water-resistant silica gel plate 4 is arranged between the layer of keys 3 and the main control board 8, preventing water and dust from entering the encryption keyboard 100 through the key holes on the keyboard panel 1 and the lining plate 2, and preventing their effects or damages to the circuit on the main control board 8 which may further lead to abandonment of the whole encryption keyboard 100.

The sealed flexible circuit board 5 and the backing plate 6 are arranged between the water-resistant silica gel plate 4 and the main control board 8. An anti-probing detection circuit (not shown) is provided in the sealed flexible circuit board 5. The anti-probing detection circuit is connected to the surface of the sealed flexible circuit board 5 via a circuit pin 51, and is electrically connected with a control circuit (not shown) of the main control board by conductive rubber 7. The sealed flexible circuit board 5 fully covers the main control board in front of the encryption keyboard, effectively preventing probing initiated from the front of the encryption keyboard 100. Once the probing from the front of the encryption keyboard 100 meets the sealed flexible circuit board 5 anywhere, the anti-probing detection circuit is activated. The anti-probing detection circuit transmits a signal to the control circuit of the main control board 8 via the circuit pin 51 and the conductive rubber 7. The control circuit outputs a keyboard self-destruct instruction, completely destroying the encryption keyboard, thereby protecting the frontal panel from being probed into, and greatly increasing the security of the encryption keyboard.

Figure 1:
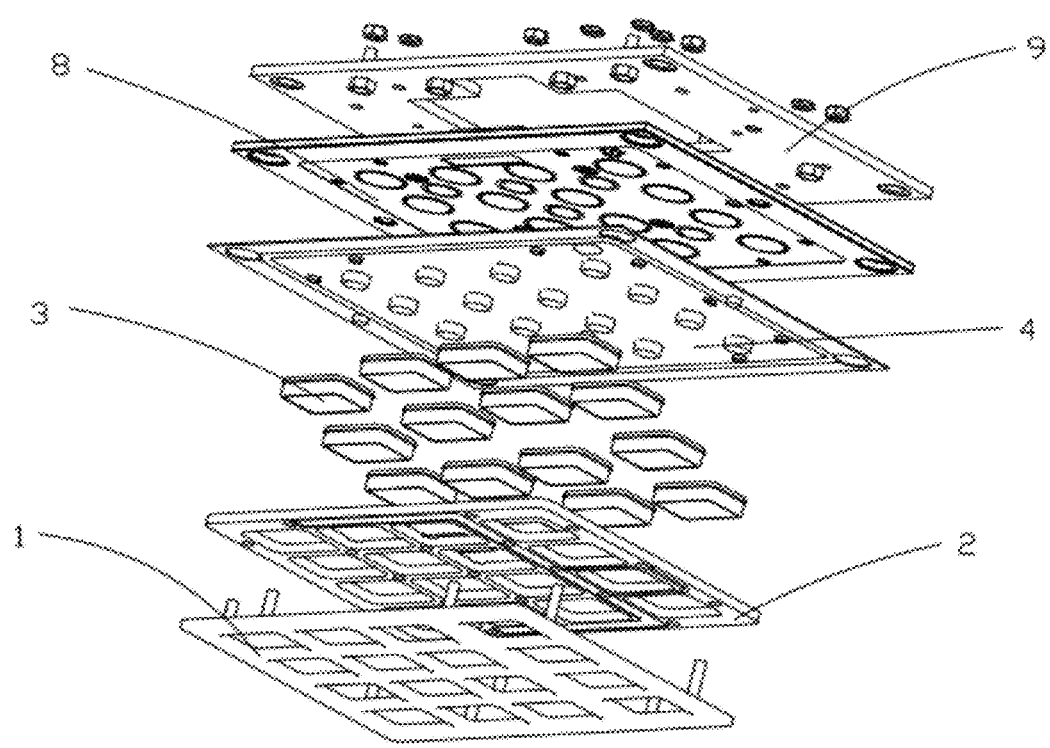
FIG. 1 is an exploded view of a conventional encryption keyboard.
Figure 2:
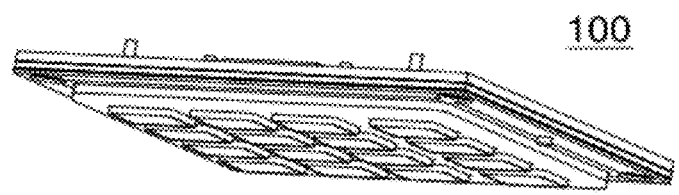
FIG. 2 is a perspective view of a novel encryption keyboard according to a preferred embodiment of the invention.
Figure 4:
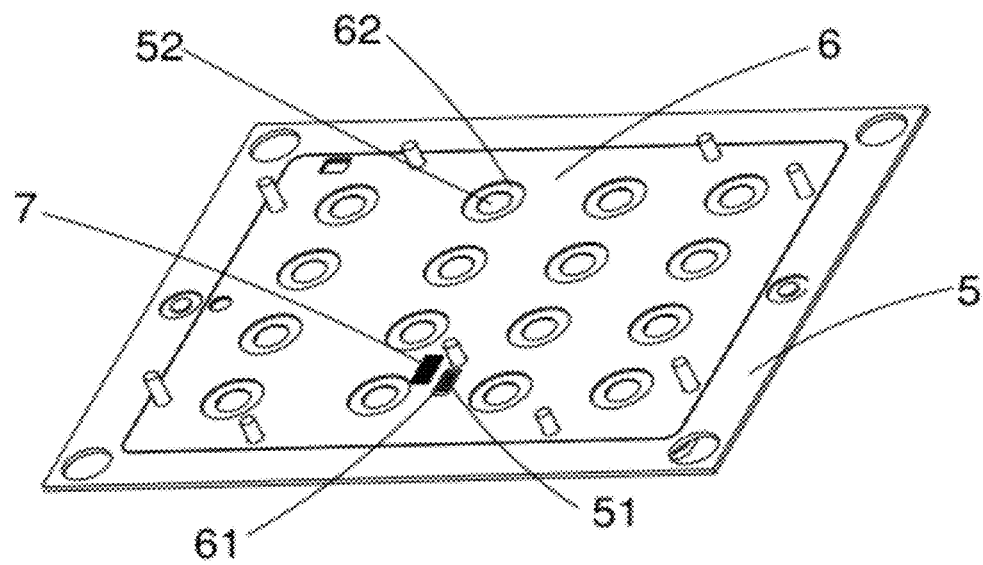
FIG. 4 is an assembly view of the sealed flexible circuit board, the backing plate and the conductive rubber shown in FIG. 3.

Referring to FIG. 2 to FIG. 4, the number of the bolts 12 for packaging the keyboard welded on the keyboard panel 1 is nine, eight of which are arranged along the four edges of the keyboard with each edge having two blots, and the ninth one is arranged in the middle of the encryption keyboard. The conductive rubber 7 is arranged near the ninth bolt. Positioned with the help of the welded bolt, the conductive rubber 7 ensures that the circuit pin 51 on the sealed flexible circuit board 5 is precisely aligned with the circuit pin of the main control board 8. It is further ensured that after assembly the conductive rubber 7 can maintain a good force-bearing state, so that when the encryption keyboard 100 is assembled, the circuit pin 51 on the sealed flexible circuit board 5, the conductive rubber 7 and the circuit pin of the main control board 8 can be pushed in place; and once being illegally loosened, the encryption keyboard 100 can self-destruct. For the circuit pin 51 on the sealed flexible circuit board 5 to contact with the conductive rubber 7, a through-hole 61 is formed on the backing plate 6 correspondingly to the circuit pin 51. The through-hole 61 may contain the conductive rubber 7 and position the conductive rubber 7, so that precise positioning of the circuit pin 51 on the sealed flexible circuit board 5, the conductive rubber 7 and the circuit pin of the main control board 8 is guaranteed.

The sealed flexible circuit board 5 can only be pressed for a limited number of times, which is far less than the 1,000,000 requirement for keys. Therefore, through-holes 52 and 62 are formed on the sealed flexible circuit board 5 and the backing plate 6 correspondingly to the key 3 and a push rod 33 respectively. As shown in FIG. 3 and FIG. 4, the key 3 goes through the through-holes 52 and 62 and directly pushes a key contact on the main control board 8. Due to the presence of the through-hole 52, the sealed flexible circuit board 5 no longer fully covers the main control board 8, resulting in areas vulnerable to frontal probing to the encryption keyboard. If a probing attack is directed downwards from a key, it may dodge the detection of the sealed flexible circuit board 5 and easily reach the main control board 8. With some techniques such as disguise, user passwords may be captured, causing a great safety risk.

Figure 5:
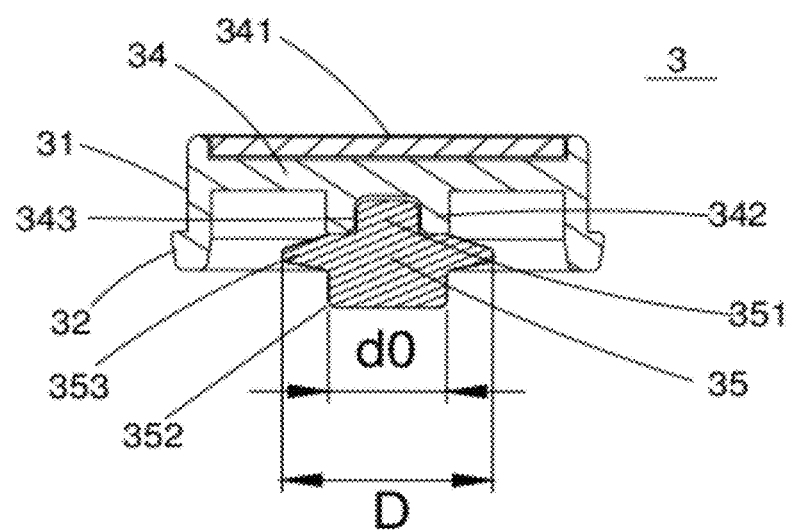
FIG. 5 is a structural diagram of a detachable key according to a preferred embodiment of the invention.
Figure 6:
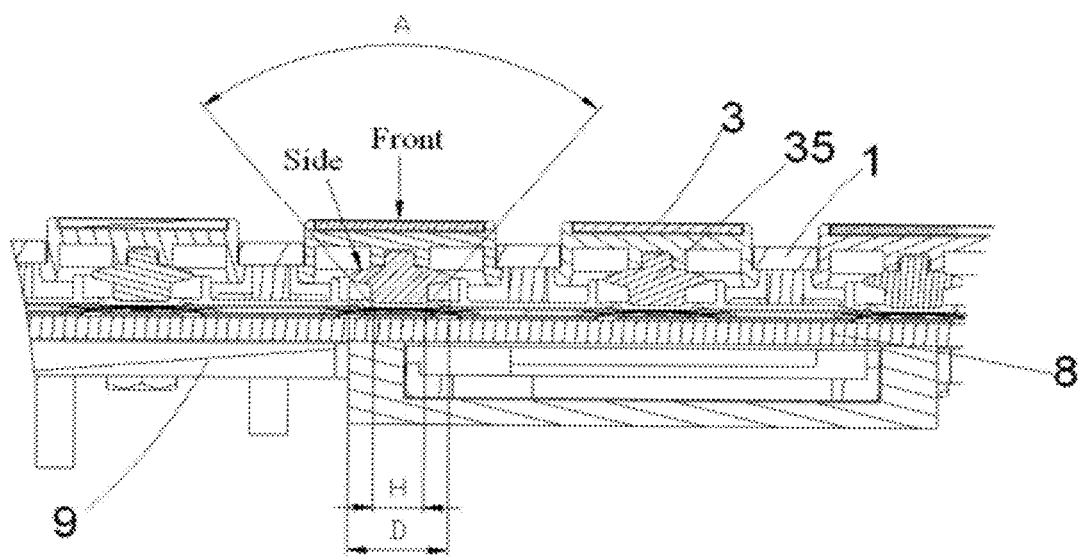
FIG. 6 is a sectional view of an encryption keyboard according to a preferred embodiment of the invention.

To solve the problem above, the invention further provides a detachable key 3. As shown in FIG. 5 and FIG. 6, the key 3 includes a key cap 34 and a push rod 35. The key cap 34 includes a cap top 341, and a container 342 on the lower surface of the cap top 341 and having a downward opening. The push rod 35 includes a first end 351 and a second end 352. The key cap 34 joins with the first end 351 of the push rod 35 via the container 342, and the diameter of the first end 341 is slightly smaller than the inner diameter of the container 342. Therefore, a gap is formed between the first end 351 of the push rod 35 and the walls 343 of the container 342. As the gap may make things slippery, it may trouble the bad guys while they are trying to probe into the key cap from its front, thereby preventing probing. Furthermore, an umbrella-shaped structure 353 is provided, which joins between the first end 351 and the second end 352 of the push rod 35. The diameter of the umbrella-shaped structure 353 is larger than the diameter of the key through-holes 52 and 62 on the sealed flexible circuit board 5 and the backing plate 6. When assembled, the umbrella-shaped structure is arranged between the keyboard panel 1 and the lining plate 2. The umbrella-shaped structure 353 covers the key through-hole 52 on the sealed flexible circuit board. Therefore, if some one tries to probe into the key cap 34 from the side, they may slip on the top slope of the umbrella-shaped structure 353, thereby preventing probing, and securing areas protected by the entire umbrella-shaped structure 353, thus eliminating the safety risk due to the key through-hole 52 formed on the flexible circuit board 5. Moreover, for the comfortableness of the keys, the second end 352 of the push rod is normally designed to have a diameter d0 smaller than the diameter of the through-holes 52 and 62, but larger than the diameter of the package structure of the key contact on the main control board. Therefore, when the key is pressed sideways and its bottom is slightly shifted, an elastic member of the key contact can be pressed smoothly. In addition, to further prevent illegal probing through the keys, the key cap 34 of the key 3 may be made of stainless steel, and the push rod may be made of heat-treated 45# steel having a HRC hardness higher than 45, which protects the keys from being probed into or broken from the material perspective.

Please refer to FIG. 5 for the anti-probing principle of the detachable key 3. Based on calculation, the diameter D of the umbrella-shaped structure is set to a proper value, which ensures that the diameter H of the circular area formed by the intersection of the area with the angle A and the upper plane of the main control board 8 is larger than the diameter of the through-hole 52 on the flexible circuit board 5, the area with the angle A being defined by the extreme positions where the umbrella-shaped structure can be probed into from the exposed surface of the key 3. Therefore, while the key 3 is being probed sideways from its exposed surface: if it is probed from outside the area with the angle A, once the flexible circuit board 5 is reached, a break in any line of the circuit or a short circuit between any two adjacent lines of the circuit may produce a self-destruct signal, causing the keyboard to self-destruct and thereby providing good protection; and if the key 3 is probed from within the area with the angle A, it can not be broken through due to the slipperiness of the push rod 35, thereby protecting the main control board 8 and protecting user passwords from being stolen.

As can be seen, various alternations and modifications can be made by those skilled in the art without deviation from the scope of the invention. These alternations and modifications should also be included in the scope of the invention.

The invention claimed is:

1. An encryption keyboard, comprising a panel and a main control board, wherein:
   a sealed flexible circuit board is provided between the panel and the main control board;
   an anti-probing detection circuit is provided in the sealed flexible circuit board; and
   the anti-probing detection circuit is connected to a surface of the sealed flexible circuit board via a circuit pin, and electrical connection is formed via the circuit pin between the anti-probing detection circuit and a control circuit of the main control board which implements a self-destruct function; and
   a backing plate is provided between the sealed flexible circuit board and the main control board; a through-hole is formed in the backing plate correspondingly to the circuit pin; and the through-hole is adapted to contain conductive rubber, and the electrical connection between the anti-probing detection circuit and the control circuit of the main control board which implements the self-destruct function is formed via the circuit pin by the conductive rubber; and
   a water-resistant silica gel plate is provided between the panel and the sealed flexible circuit board; and
   the encryption keyboard further comprises a lining plate between the panel and the water-resistant silica gel plate;
   a plurality of key holes are formed on the panel, the lining plate, the water-resistant silica gel plate, the sealed flexible circuit board and the backing plate;
   a plurality of keys are mounted in the key holes; each of the keys comprises a key cap and a push rod; the push rod comprises a first end connecting with the key cap, and a second end penetrating through a key hole to contact with and push a key contact on the main control board; the key cap comprises a cap top, and a container on the lower surface of the cap top and having a downward opening; and the key cap joins with the first end of the push rod via the container, and the first end of the push rod has a diameter smaller than an inner diameter of the container.

2. The encryption keyboard according to claim 1, wherein, an umbrella-shaped structure is provided, which joins between the first end and the second end of the push rod; and the umbrella-shaped structure has a diameter larger than a diameter of the key hole.

3. The encryption keyboard according to claim 2, wherein, the second end of the push rod has a diameter smaller than the diameter of the key hole, and larger than a diameter of a package structure of the key contact on the main control board.

4. The encryption keyboard according to claim 3, wherein, the key cap is made of stainless steel, and the push rod is made of heat-treated steel grade 45 having a hardness larger than 45.

5. The encryption keyboard according to claim 4, wherein:
   the encryption keyboard further comprises a bottom plate;
   welded bolts for packaging the keyboard are provided on the panel of the encryption keyboard;
   through-holes for holding the welded bolts are provided on the lining plate, the water-resistant silica gel plate, the sealed flexible circuit board, the backing plate, the main control board and the bottom plate correspondingly to the welded bolts on the panel; and
   the lining plate, the water-resistant silica gel plate, the sealed flexible circuit board, the backing plate, the main control board and the bottom plate are mounted on the welded bolts sequentially, and are fastened with corresponding nuts.

6. The encryption keyboard according to claim 5, wherein:
   the number of the welded bolts is nine;
   eight of the bolts are arranged along the four edges of the keyboard panel, with each edge having two blots; and
   the ninth bolt is arranged in the middle of the panel of the encryption keyboard, and the conductive rubber is arranged near the ninth bolt.

* * * * *